Figure 5:
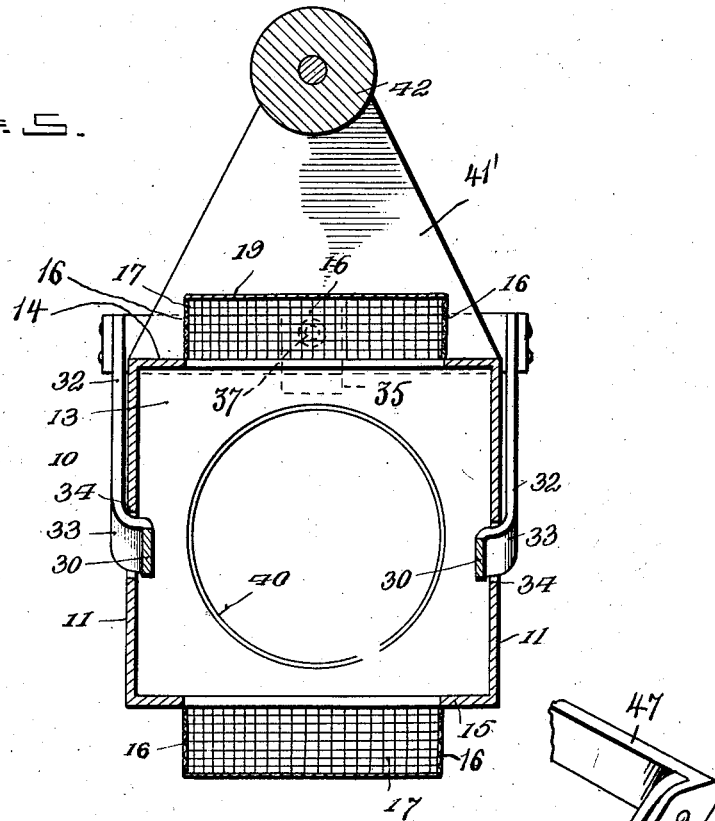

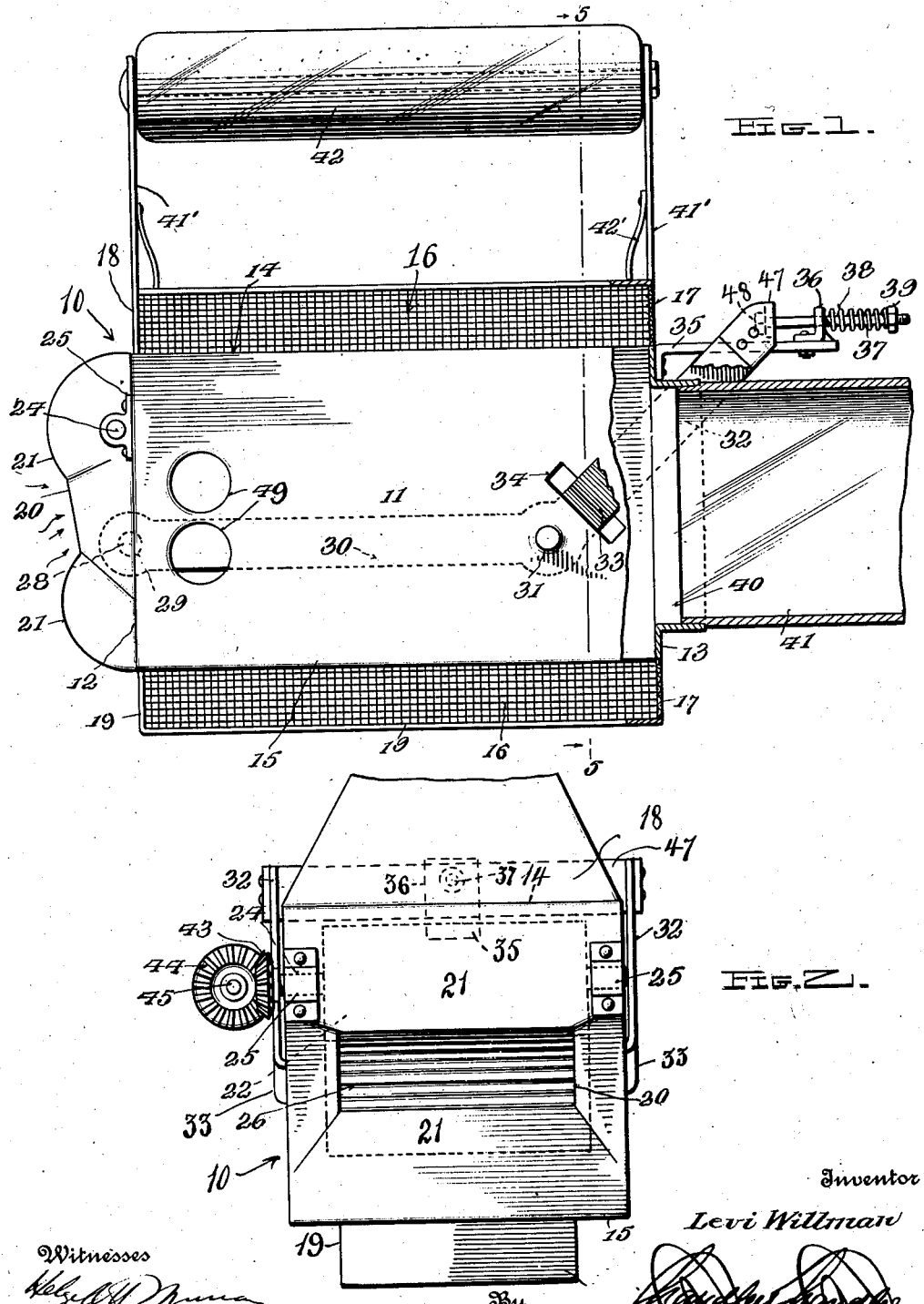

L. WILLMAN.
COTTON PICKER.
APPLICATION FILED JULY 7, 1910.
1,027,455.
Patented May 28, 1912.
3 SHEETS—SHEET 2.
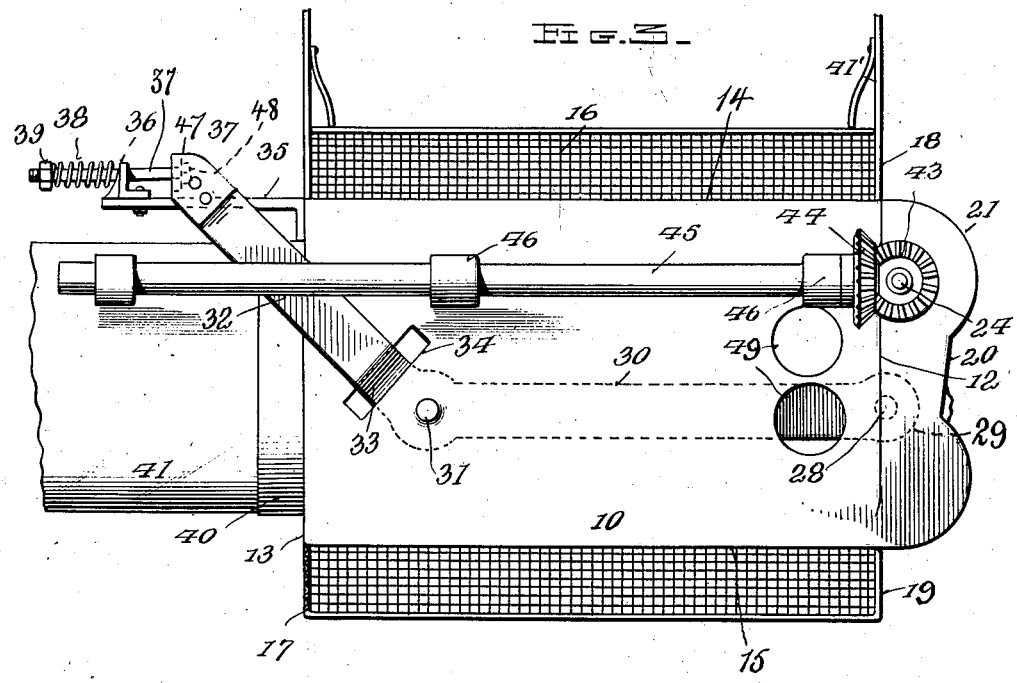
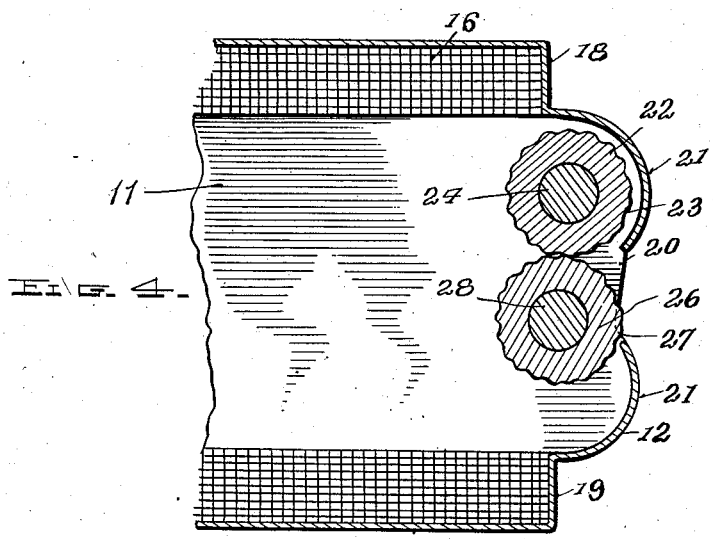

L. WILLMAN.
COTTON PICKER.
APPLICATION FILED JULY 7, 1910.

1,027,455.

Patented May 28, 1912.

3 SHEETS—SHEET 3.

Witnesses

Inventor
Levi Willman
By
Attorneys

UNITED STATES PATENT OFFICE.

LEVI WILLMAN, OF STILLWATER, OKLAHOMA.

COTTON-PICKER.

1,027,455.  Specification of Letters Patent.  Patented May 28, 1912.

Application filed July 7, 1910. Serial No. 570,811.

*To all whom it may concern:*

Be it known that I, LEVI WILLMAN, a citizen of the United States, residing at Stillwater, in the county of Payne, State of Oklahoma, have invented certain new and useful Improvements in Cotton - Pickers; and I do hereby declare the following to be a full, clear, and exact description of the invention, such as will enable others skilled in the art to which it appertains to make and use the same.

The invention relates to a cotton picker, and more particularly to the class of cotton picking heads or mouth pieces for the suction tubes of cotton picking machines.

The primary object of the invention is the provision of a cotton picking head of this character in which the cotton from the bolls of cotton plants may be drawn into the head and conveyed through the suction tubes to a suitable receiver without requiring the picking of the cotton by hand from the growing cotton plants.

Another object of the invention is the provision of a cotton picking head in which air will be admitted therein from the top and bottom of said head so as to effect a suction current through the head whereby cotton will be drawn in through the mouth portion thereof without subjecting the cotton thus drawn into the head to a direct suction current thereby avoiding the ingress of leaves and other foreign matter with the cotton when being picked from the growing plants.

A further object of the invention is the provision of a cotton picking head or mouth piece in which there are arranged a plurality of contacting pulling rollers one of which being driven by a rotatable shaft so that by contacting with each other the same will be driven in opposite directions thereby pulling the cotton and drawing the same into the head whereby it will be subjected to a suction current that will convey it into a receiver or the like, the suction current being taken into the head at a point rearwardly of its mouth portion thus obviating any possibility of the collecting of trash, leaves or other foreign matter during the picking operation of the head.

A further object of the invention is the provision of a cotton picking head which will collect cotton from growing plants without the accumulation of other trash or foreign matter therewith while being drawn into the said head for subsequent distribution to a receiver or the like.

A still further object of the invention is the provision of a cotton picking head which is simple in construction, thoroughly reliable and efficient in operation and inexpensive in manufacture.

In the drawings accompanying and forming part of this specification is illustrated the preferred form of embodiment of the invention, which to enable those skilled in the art to carry the invention into practice, will be set forth at length in the following description while the novelty of the invention will be pointed out in the claims succeeding the description.

Figure 6:
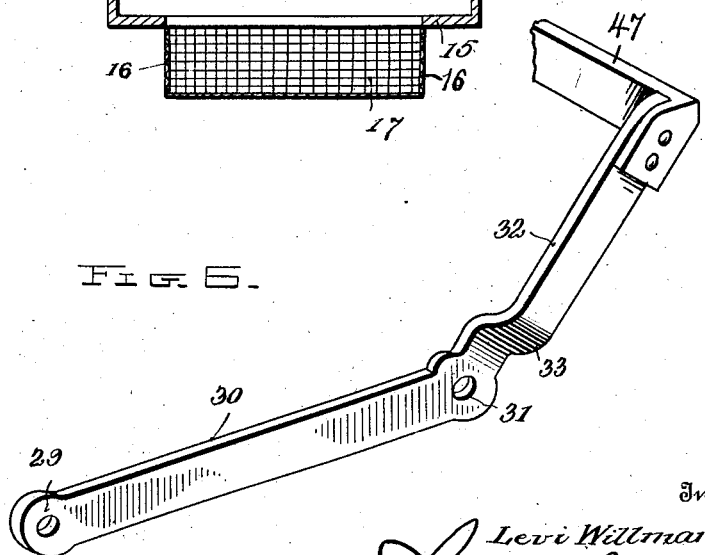

In the drawings:—Figure 1 is a side elevation of a cotton picking head constructed in accordance with the invention, the same being partly broken away. Fig. 2 is a front elevation thereof. Fig. 3 is an opposite side elevation. Fig. 4 is a vertical longitudinal sectional view through the same. Fig. 5 is a transverse sectional view on the line 5—5 of Fig. 1. Fig. 6 is a detail perspective view of one of the pivotal arms for supporting the movable roller.

Similar reference characters indicate corresponding parts throughout the several views in the drawings.

Referring to the drawings by numerals 10 designates generally a cotton picking nozzle or head comprising a hollow casing having side walls 11, front and rear walls 12 and 13 and a top and bottom 14 and 15, the top and bottom being provided with elongated openings covered by screens each comprising foraminous side and rear end walls 16 and 17 and closed top and front walls 18 and 19, the screens being adapted to permit the ingress of air into the said casing for a purpose as will be hereinafter more fully described.

The front wall 12 of the casing is provided with a central elongated mouth opening 20, the front wall being bulged as at 21 at opposite sides of the said mouth opening 20 and within the upper bulged portion 21 is disposed a rotatable picking roller 22 having a corrugated outer surface 23, the corrugations being extended throughout the length of the roller, and this roller 22 is fixed upon a shaft 24 the latter being journaled at opposite ends in bearings 25 fixed exteriorly to the front wall 12 of the casing. Immediately below the roller 22 is a second adjustable picking roller 26 having a corrugated outer surface 27 coextensive with the length thereof, the roller 26 being normally in contact with the said roller 22 and being supported upon a shaft 28 the latter being journaled at its ends in bearing ears 29 formed at the forward ends of swinging arms 30 the latter being connected within the said casing to the side walls thereof by means of pivots 31, the arms being formed at their rear ends with angular extensions 32 provided with bends 33 whereby the said extensions 32 are offset relative to the arms 30 and are passed through elongated slots 34 in the said side walls 11 of the casing to be operated upon by tensioning devices as will be hereinafter more fully described. The rear ends of the angular extensions 32 of the arms 30 are connected by a bar 47. Connected to the rear wall 13 of the casing is an arm 35 which supports an upwardly directed bracket 36 through which a bolt 37 slidably engages, the bolt fitting loosely through a relatively large aperture 37' in the bar 47 and being prevented from outward movement by a head 48. The bolt 37 is provided with an adjusting nut 39 upon its outer end, and surrounding the bolt between the bracket 36 and the nut 39 is a coil spring 38, the force of the spring operating to move the bolt 37 and the bar 47 to which it is connected rearwardly, the springs tensioning the arms to normally maintain the lower picking roller 26 in contact with the upper picking roller 22 when the head is in operation for picking cotton from growing plants.

The rear wall 13 is provided with a suitable outlet opening surrounded by a circular nipple 40 to which is suitably connected a flexible air suction tube 41 leading to a place for the deposit of picked cotton (not shown). Fixed to and rising from the top of the casing at opposite ends thereof are ears 41' between which is disposed a hand grip or handle 42 the latter being connected to the said ears 41' in any suitable manner.

The screen covering the opening in the top of the casing is removably held in position thereon by means of detachable clips or gripping members 42' which are secured by removable fastening means so that upon removal of the said upper screen access may be readily had to the interior of the casing when required.

On the end of the shaft 24 supporting the roller 22 is fixed a beveled gear 43 the latter meshing with a beveled pinion 44 fixed to a driven shaft 45 journaled in suitable bearings 46 projecting outwardly from one side of the casing of the head or nozzle, the shaft 45 being driven in any suitable manner, so that rotary motion will be imparted to the roller 22 which latter by the contact of the roller 26 will drive the said roller 26 in the reverse direction whereby on bringing the head or nozzle in contact with the cotton bolls, the said rollers will pull the cotton therefrom and deliver it within the said head or nozzle. The suction, by any suitable fan within the suction tube 41, will cause air to be drawn in to the head or nozzle through the screens so that cotton delivered into the said head or nozzle will be whisked by pneumatic action through the tube into a receiver or other depository (not shown).

By the arrangement of the screens at the top and bottom of the nozzle or head it will be obvious that trash leaves or other foreign matter will not gain access to the interior of the said nozzle or head, and by reason of the broad area of the said screens the ingress of air will not be interfered with when entering the nozzle or head should any portion of the screen become plugged or covered by trash, leaves or other foreign matter. Thus an active suction current will be constantly set up in the said nozzle or head to convey the cotton delivered thereinto through the tube.

If nothing is drawn in except the cotton through the mouth 20 in the front end of the head or nozzle, it will be seen that only an infinitesimal amount of foreign matter or trash will gain access to the said nozzle or head thereby increasing the value and quality of the cotton picked by the head or nozzle. It is evident that this head may be readily carried in the hand of an operator so that the same may be brought in close contact to growing cotton plants whereby the cotton may be sucked into the head or nozzle from the cotton bolls on the plants.

From the foregoing it is thought that the construction and operation of the invention will be clear and comprehensive and therefore a more extended explanation has been omitted.

In the opposite side walls of the casing 10 are air ports 49 the same being arranged adjacent to the peripheries of the picking rollers so as to prevent cotton from wrapping around the journal ends between the ends of the rollers and the inner faces of the side walls of the casing. When a suction is created in the casing 10 air will be sucked through the openings 49 and will deflect cotton from the ends of the rollers toward the center of the casing. The corrugated rollers permit the air sucked into the casing to flow therebetween and the picking process is thereby facilitated.

What is claimed is:—

1. A cotton picking device comprising a casing having a mouth opening in its front and also openings in its top and bottom, screens fitted over the top and bottom openings, superposed rotatable corrugated rollers arranged within the casing adjacent the mouth opening, tension means acting upon one of said rollers to normally hold it in contact with the other roller, a suction tube communicating with the casing and a handle rising from the top of said casing.

2. In a cotton picker, a casing having a mouth opening, a roller journaled on one side of the mouth opening, a second roller contacting with the first roller in the casing, a lever connected at its forward end to the second roller and pivoted to the casing, said lever being formed with an offset portion and movable in a slot formed in the casing, a lateral arm on the rear end of the lever, and a spring rod pressing against said lateral arm.

3. In a cotton picker, a casing having a mouth opening in one end, suction means connected with the other end of the casing, a corrugated roller mounted on one side of the mouth opening in the casing, a corrugated roller mounted in the casing adjacent the other corrugated roller, a lever pivoted to the inner side of the casing and connected at its forward end to the second roller, said casing having a slot near its rear end, said lever having an offset portion movable in the slot and the rear end of the lever extending rearwardly of the end of the casing, and a spring rod mounted on the rear end of the casing adapted to bear against the rear end of the lever for holding the second roller in normal contact with the first roller.

4. In a cotton picker, a casing having a mouth opening at one end provided with bulged walls above and below the same, foraminous inclosures projecting from the top and bottom of the casing and closed upon their front and top and front and bottom walls respectively, corrugated rollers rotatably mounted adjacent to said opening, one of said rollers being disposed within the upper bulged portion and the remaining roller being disposed partly within the opening, a suction tube leading rearwardly from the casing, means for rotating the upper roller to simultaneously actuate the lower roller, arms pivotally connected to the casing and rotatably receiving the ends of the lower roller, a cross bar connecting the rear ends of the arms and disposed over the tube and resilient means acting upon the cross bar to hold the lower roller in contact with the upper roller.

In testimony whereof, I affix my signature, in presence of two witnesses.

LEVI WILLMAN.

Witnesses:
JOHN WILLMAN,
THEO. L. MURPHY.